(12) United States Patent
Miyazawa et al.

(10) Patent No.: US 12,481,845 B2
(45) Date of Patent: Nov. 25, 2025

(54) CARD READER

(71) Applicant: NIDEC INSTRUMENTS CORPORATION, Nagano (JP)

(72) Inventors: Shinya Miyazawa, Nagano (JP); Yukihiko Takita, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 0 days.

(21) Appl. No.: 18/625,133

(22) Filed: Apr. 2, 2024

(65) Prior Publication Data

US 2024/0330610 A1 Oct. 3, 2024

(30) Foreign Application Priority Data

Apr. 3, 2023 (JP) ................. 2023-059951

(51) Int. Cl.
*G06K 7/10* (2006.01)
*G06K 7/00* (2006.01)
*G06K 19/077* (2006.01)

(52) U.S. Cl.
CPC ......... *G06K 7/0021* (2013.01); *G06K 19/077* (2013.01)

(58) Field of Classification Search
CPC .. G06K 19/077; G06K 7/0013; G06K 7/0004; G06K 7/087; G06K 7/00; G06K 19/06196; G06K 7/0021
USPC ......................................................... 235/441
See application file for complete search history.

(56) References Cited

U.S. PATENT DOCUMENTS

| | | | | |
|---|---|---|---|---|
| 6,616,050 | B1 * | 9/2003 | Oki | G06K 7/003 |
| | | | | 235/475 |
| 6,820,806 | B2 * | 11/2004 | Nagata | G06K 13/08 |
| | | | | 235/483 |
| 6,834,809 | B2 * | 12/2004 | Ogushi | G06K 13/0875 |
| | | | | 235/483 |
| 10,282,568 | B2 * | 5/2019 | Miyazawa | G06K 7/0056 |
| 10,402,705 | B2 * | 9/2019 | Mizawa | G06K 13/085 |
| 2004/0262389 | A1 * | 12/2004 | Nagata | G06K 13/085 |
| | | | | 235/441 |
| 2019/0005277 | A1 * | 1/2019 | Miyazawa | G06K 7/06 |
| 2019/0354730 | A1 * | 11/2019 | Takahashi | G06K 7/0078 |

* cited by examiner

*Primary Examiner* — Daniel St Cyr
(74) *Attorney, Agent, or Firm* — HAUPTMAN HAM, LLP

(57) ABSTRACT

In this card reader, an IC contact block includes a resin block body to hold a plurality of IC contact springs, and card abutting members formed with card abutting surfaces on which an end surface on a back side of a card abuts, formed separately from the block body, and mounted on the block body. Each card abutting member is made of a material harder than resin.

8 Claims, 7 Drawing Sheets

CARD READER

RELATED APPLICATIONS

The present application claims priority to Japanese Application Number 2023-059951, filed Apr. 3, 2023, the disclosure of which is hereby incorporated by reference herein in its entirety.

BACKGROUND

Field of the Invention

At least an embodiment of the present invention relates to a card reader that reads data recorded on a contact type IC card and records data on a contact type IC card.

DESCRIPTION OF THE RELATED DOCUMENTS

Conventionally, a card reader that reads data recorded on a contact type IC card and records data on a contact type IC card is known (for example, see Japanese Patent Application Laid-open No. 2019-8713). The card reader described in Japanese Patent Application Laid-open No. 2019-8713 includes a body frame formed with a card movement path therein, a plurality of contact springs that come into contact with an external connection terminal of an IC chip formed on the card, and an IC contact block that holds the plurality of contact springs. The card to be processed by the card reader described in Japanese Patent Application Laid-open No. 2019-8713 is a card made of vinyl chloride.

In the card reader described in Japanese Patent Application Laid-open No. 2019-8713, the IC contact block is made of resin. The IC contact block is movable relative to the body frame between a contact position at which the IC contact springs can come into contact with the external connection terminal and a retreat position at which the IC contact springs retreat to such a position as not to come into contact with the external connection terminal. A guide shaft is mounted on the IC contact block to guide the IC contact block between the contact position and the retreat position. The body frame is formed with a cam groove that engages with an end of the guide shaft, and the IC contact block is guided between the contact position and the retreat position by the guide shaft and the cam groove.

In the card reader described in Japanese Patent Application Laid-open No. 2019-8713, the IC contact block is formed with an abutting part on which a back side end surface of the card that moves on the card movement path toward the back side of the card reader abuts. When the IC contact block is pushed towards the back side by the card that abuts on a card abutting surface of the abutting part, the IC contact block moves from the retreat position towards the contact position. The IC contact block that moves from the retreat position toward the contact position moves toward the card in the thickness direction of the card as the IC contact block moves toward the back side. Therefore, when the abutting part is pushed by the card and the IC contact block moves from the retreat position to the contact position, and the card moves in the thickness direction relative to the card abutting surface in a state in which the back side end surface of the card is in contact with the card abutting surface at predetermined contact pressure.

In recent years, metal cards that were not previously used have begun to be distributed on the market. In a case where a metal card is processed by the card reader described in Japanese Patent Application Laid-open No. 2019-8713, when the IC contact block moves from the retreat position to the contact position, the card moves in the thickness direction of the card relative to the card abutting surface in the state in which the back side end surface of the metal card is in contact with the card abutting surface of the resin IC contact block at the predetermined contact pressure. Therefore, there is a risk of scratches or abrasion on the card abutting surface.

In the card reader described in Japanese Patent Application Laid-open No. 2019-8713, when the card abutting surface is scratched, it becomes difficult that the card relatively moves along the card abutting surface in the thickness direction of the card, and therefore there is a risk of reduction in operability of the card reader. In addition, in the card reader described in Japanese Patent Application Laid-open No. 2019-8713, in a case where the card abutting surface becomes abraded, even when the IC contact block is pushed to the back side by the card that abuts on the card abutting surface, the IC contact block may not be able to be moved to the contact position, or the IC contact springs may come into contact with a part on the back side with respect to the external connection terminal in the card.

Therefore, an object of at least an embodiment of the present invention is to provide a card reader that can suppress the occurrence of scratches and abrasion on a card abutting surface even when a metal card is processed in a card reader that moves an IC contact block from a retreat position to a contact position by a card that abuts on the card abutting surface of the IC contact block.

SUMMARY

In order to solve the above problem, a card reader of an aspect of at least an embodiment of the present invention including: a plurality of IC contact springs to come into contact with an external connection terminal of an IC chip formed in a card; an IC contact block to hold a plurality of the IC contact springs; and a body frame formed with a card movement path to allow the card to move, wherein when one side in a movement direction of the card that linearly moves on the card movement path is defined as a back side, a side opposite to the back side is defined as a near side, and one side in a thickness direction of the card that linearly moves on the card movement path is defined as a first direction side, the IC contact block includes: a resin block body to hold a plurality of the IC contact springs; and a card abutting member formed with a card abutting surface on which an end surface on the back side of the card abuts, and mounted on the block body formed separately from the block body, and the IC contact block is movable with respect to the body frame between a contact position at which the IC contact springs are capable of coming into contact with the external connection terminal and a retreat position at which the IC contact springs retreat to such a position as not to come into contact with the external connection terminal, when the card abutting member is pushed toward the back side by the card which abuts on the card abutting surface, the IC contact block moves from the retreat position toward the contact position, the IC contact block that moves from the retreat position toward the contact position moves toward the first direction side as the IC contact block moves toward the back side, and the card abutting member is made of a material harder than resin.

In this aspect, the card abutting member is made of metal or ceramic.

In the card reader of this aspect, the card abutting member is made of a material harder than resin. Therefore, in this aspect, when the IC contact block moves from the retreat position toward the contact position, even if the card moves relatively in the thickness direction of the card with respect to the card abutting surface of the card abutting member in a state in which the end surface on the back side of the metal card is in contact with the card abutting surface at predetermined contact pressure, it is possible to suppress the occurrence of scratches and abrasion on the card abutting surface. Therefore, in the card reader of this aspect, it is possible to suppress the occurrence of scratches and abrasion on the card abutting surface even when the metal card is processed.

In this aspect, the card abutting member preferably includes: two regulating protrusions to regulate movement of the card abutting member in the thickness direction of the card with respect to the block body; and a body part to which base ends of the two regulating protrusions are connected, the two regulating protrusions preferably project from the body part toward the back side or the near side and are disposed at an interval in the thickness direction of the card, the block body preferably includes a block body side regulating part disposed in contact with the regulating protrusions between the two regulating protrusions in the thickness direction of the card, the IC contact block preferably includes a regulation pin to regulate movement of the card abutting member in the movement direction of the card with respect to the block body, the block body is formed with a placement hole to allow at least a portion of the card abutting member to be disposed, and an insertion hole into which the regulation pin is inserted, a regulating part side surface which is a side surface of the block body side regulating part in the movement direction of the card is preferably one of side surfaces of the placement hole in the movement direction of the card, a width of the placement hole in the movement direction of the card is preferably wider than a width of the card abutting member in the movement direction of the card, in a case where the regulating protrusions project toward the back side, a surface on the back side of the body part is preferably contact with the regulating part side surface, and a surface on the near side of the body part is preferably in contact with the regulation pin, in a case where the regulating protrusions project toward the near side, the surface on the near side of the body part is preferably in contact with the regulating part side surface, and the surface on the back side of the body part is preferably in contact with the regulation pin.

With such a configuration, the movement of the card abutting member in the thickness direction of the card with respect to the block body is regulated by the block body side regulating part, the movement of the card abutting member in the movement direction of the card with respect to the block body is regulated by the regulating part side surface and the regulation pin, and the movement of the card abutting member in the width direction of the card with respect to the block body is regulated by the side surface of the placement hole in the width direction of the card orthogonal to the movement direction of the card and the thickness direction of the card, and therefore the card abutting member can be more securely mounted on the block body compared to a case where the card abutting member is mounted on the block body by adhesive or press-fitting. Therefore, even when the card repeatedly abuts on the card abutting surface, or even when the card repeatedly moves in the thickness direction of the card relative to the card abutting surface, the card abutting member becomes difficult to come off from the block body.

With such a configuration, the width of the placement hole in the movement direction of the card is wider than the width of the card abutting member in the movement direction of the card, and therefore when the regulation pin is removed from the insertion hole of the block body, the card abutting member can be removed from the block body by using the placement hole. Therefore, it becomes possible to easily mount and replace the card abutting member.

In this aspect, the body frame is preferably formed with cam grooves to guide the IC contact block between the contact position and the retreat position, the IC contact block preferably includes a plurality of cam pins to engage with the cam grooves and guide the IC contact block between the contact position and the retreat position, and one of a plurality of the cam pins is preferably the regulation pin. With such a configuration, the movement of the card abutting member with respect to the block body can be regulated using the cam pins, and therefore the configuration of the card reader can be simplified.

In this aspect, the card reader may include: two fixed side pins mounted on the body frame; and two link members rotatable with a width direction of the card as an axis of rotation and with the fixed side pins as rotation centers, when a direction orthogonal to the movement direction of the card and the thickness direction of the card is defined as the width direction of the card, wherein the two fixed side pins may be disposed at an interval in a transport direction of the card, the two link members may be disposed at an interval in the transport direction of the card, the IC contact block may include two link pins rotatably held or fixed by the link members, a parallel link mechanism to guide the IC contact block between the contact position and the retreat position may be composed of the two fixed side pins, the two link members, and the two link pins, and one of the two link pins may the regulation pin. In this case, the movement of the card abutting member with respect to the block body can be regulated using the link pins, and therefore the configuration of the card reader can be simplified.

In this aspect, when a direction orthogonal to the movement direction of the card and the thickness direction of the card is defined as a width direction of the card, for example, a plurality of the card abutting members are mounted on the block body at an interval in the width direction of the card. In this case, it is possible to stabilize the state of the card that abuts on the card abutting surface.

As described above, in the aspect of at least an embodiment of the present invention, it is possible to suppress the occurrence of scratches and abrasion on the card abutting surface even when the metal card is processed in the card reader that moves the IC contact block from the retreat position to the contact position by the card that abuts on the card abutting surface of the IC contact block.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Figure 1:
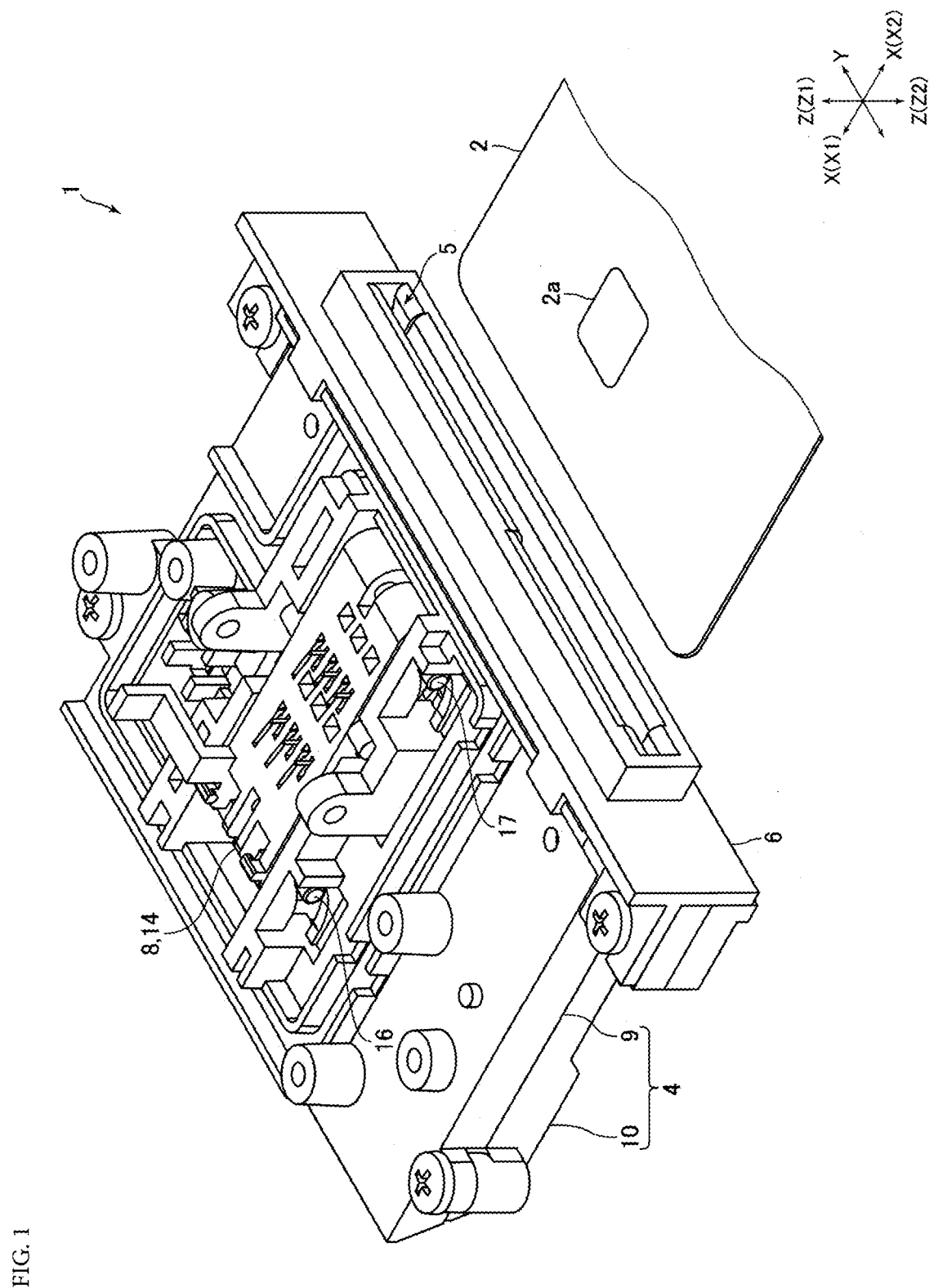
FIG. 1 is a perspective view of a card reader according to an embodiment of at least an embodiment of the present invention.
Figure 2:
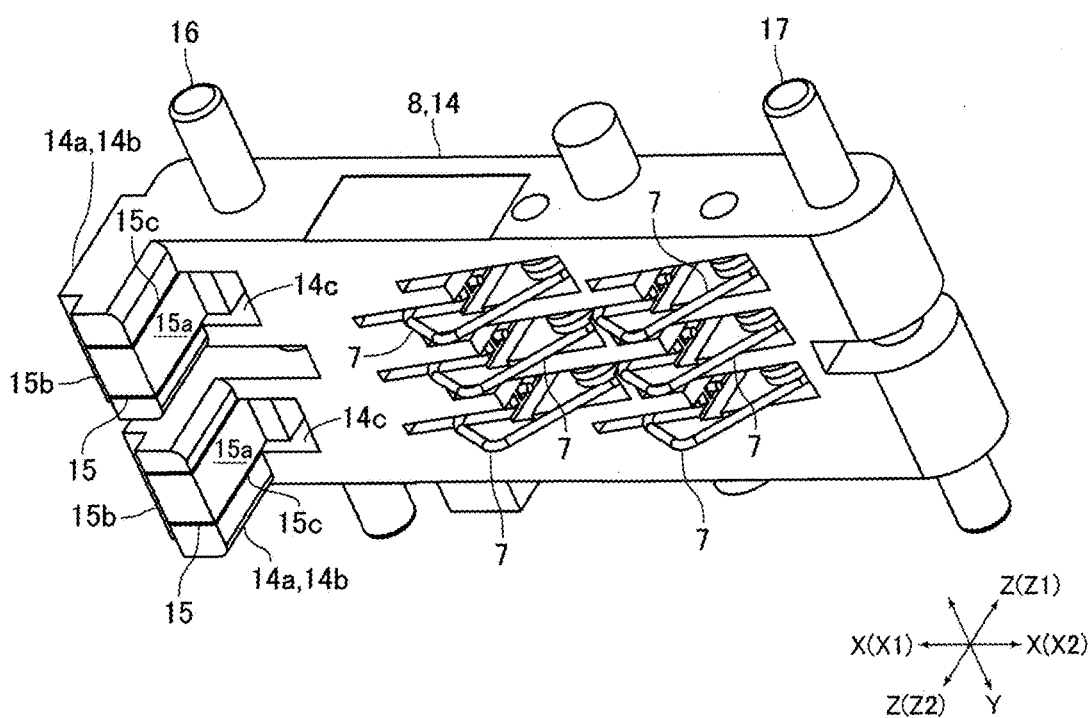
FIG. 2 is a perspective view illustrating an IC contact block and the like illustrated in FIG. 1 from a different direction.
Figure 3:
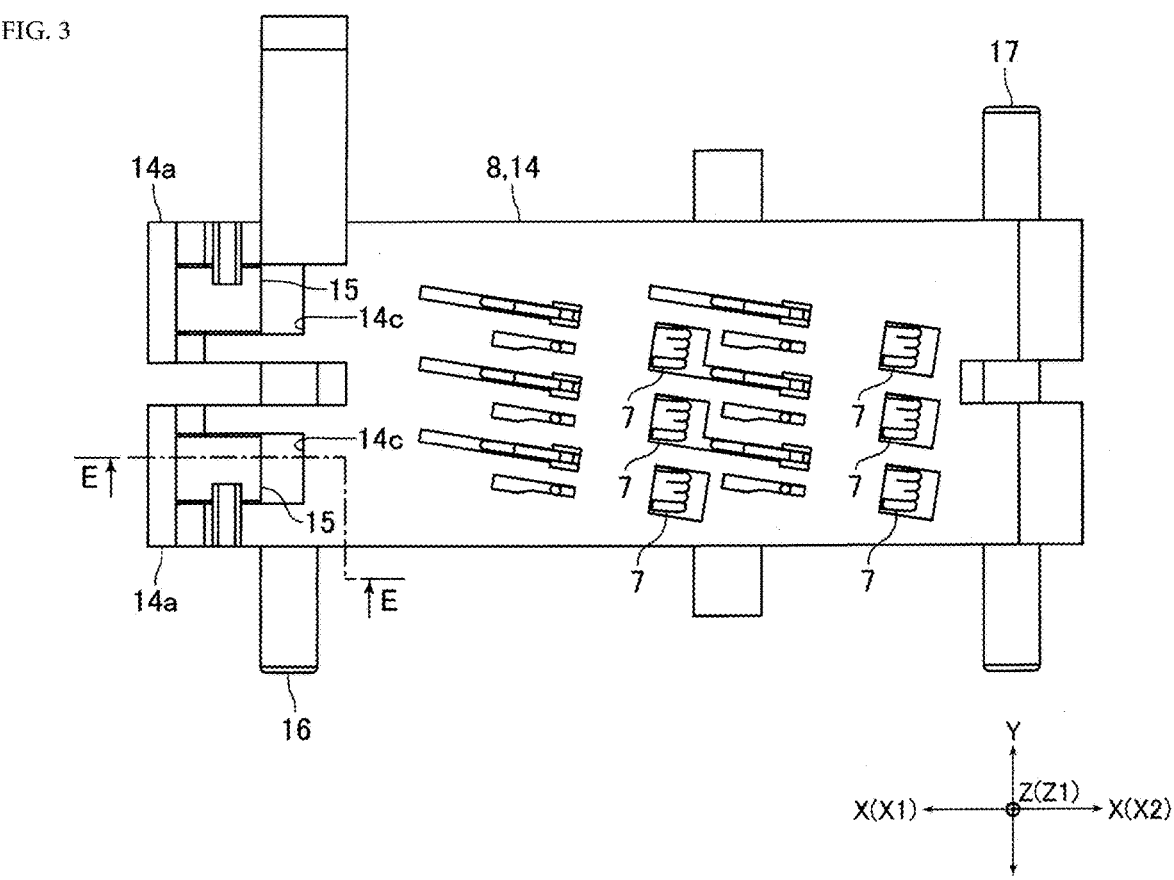
FIG. 3 is a plan view of the IC contact block and the like illustrated in FIG. 1.
Figure 4A:
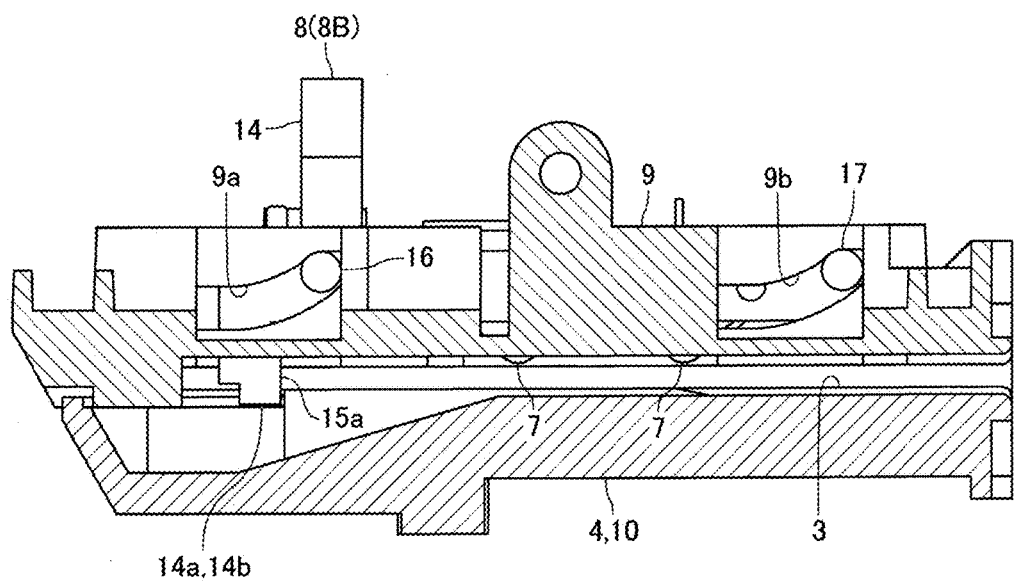
FIGS. 4A and 4B are each a sectional view for illustrating operation of the IC contact block illustrated in FIG. 1.
Figure 4B:
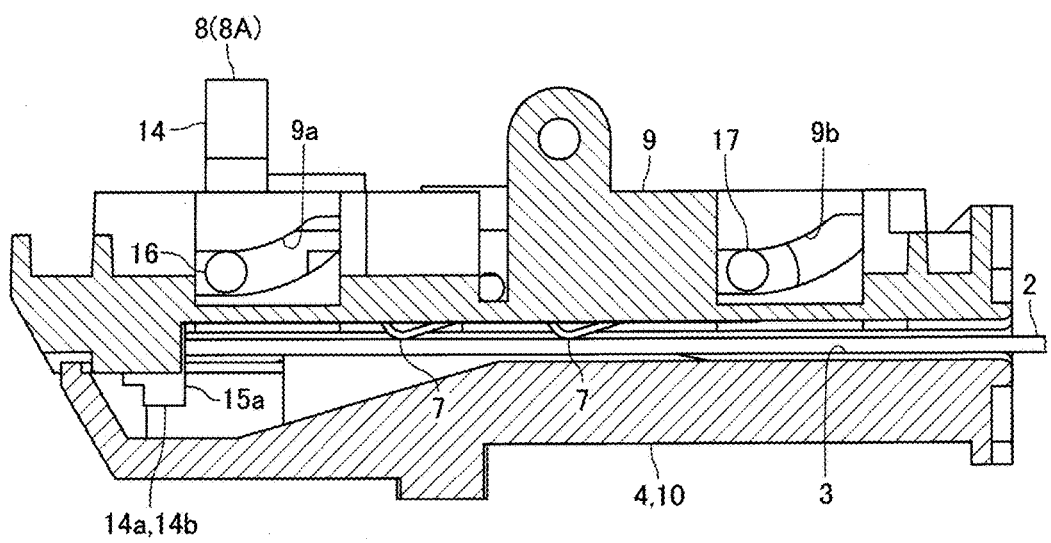

Hereinafter, at least an embodiment of the present invention will be described with reference to the drawings.
Overall Configuration of Card Reader FIG. 1 is a perspective view of a card reader 1 according to an embodiment of at least an embodiment of the present invention. FIG. 2 is a perspective view illustrating an IC contact block 8 and the like illustrated in FIG. 1 from a different direction. FIG. 3 is a plan view of the IC contact block 8 and the like illustrated in FIG. 1 FIGS. 4A and 4B are each a sectional view for illustrating operation of the IC contact block 8 illustrated in FIG. 1.

The card reader 1 in this embodiment is a device to read data recorded on a card 2 and record data on the card 2. Specifically, the card reader 1 is a so-called dip-type card reader that reads and records data by manual insertion of the card 2 into the card reader 1 and removal of the card 2 from the card reader 1. The card reader 1 is installed and used in a predetermined host device.

The card 2 is, for example, a rectangular card with a thickness of about 0.7 to 0.8 mm. The card 2, which is processed by the card reader 1 of this embodiment, is made of metal. For example, the card 2 is made of titanium. The card 2 has a built-in IC chip, and one side of the card 2 is formed with an external connection terminal 2a for the IC chip, as illustrated in FIG. 1. The card reader 1 can also process the card 2 made of vinyl chloride.

The card reader 1 includes a body frame 4 formed with a card movement path 3 (see FIGS. 4A and 4B) to allow the card 2 to move, a bezel 6 formed with an insertion port 5 for the card 2 therein, and a plurality of IC contact springs 7 that come into contact with the external connection terminal 2a of the card 2, and the IC contact block 8 that holds the plurality of IC contact spring 7. In other words, the card reader 1 is a contact type IC card reader.

In this embodiment, the manually operated card 2 moves linearly in the X direction of FIG. 1 and the like. In other words, the X direction is the direction of movement of the card 2 which moves linearly on the card movement path 3. The card 2 is inserted into the X1 direction side of FIG. 1 and the like, which is one side in the movement direction of the card 2, and removed to the X2 direction side of FIG. 1 and the like, which is the other side in the movement direction of the card 2. In addition, the Z direction in FIG. 1 and the like, which is orthogonal to the X direction, is defined as the thickness direction of the card 2 which moves linearly on the card movement path 3, and the Y direction in FIG. 1 and the like, which is orthogonal to the X direction and the Z direction, is the width direction (lateral width direction) of the card 2 which moves linearly on the card movement path 3.

In the following description, the X direction is defined as the front-rear direction, the Y direction is the left-right direction, and the Z direction is defined as the up-down direction. The X1 direction side which is the side on which the card 2 is inserted into the card reader 1 is defined as the "back" side or the "rear" side, and the X2 direction side which is the side opposite to the X1 direction side is defined as the "near" side or the "front" side. In addition, in the following description, the Z1 direction side in FIG. 1 and the like, which is one side in the up-down direction is defined as the "upper" side, and the Z2 direction side in FIG. 1 and the like, which is the side opposite to the Z1 direction side, is defined as the "lower" side. The lower side (Z2 direction side) of this embodiment is the first direction side, which is one side in the thickness direction of the card 2 which moves linearly on the card movement path 3.

The body frame 4 is composed of an upper frame 9 and a lower frame 10, which are divided into the up-down direction. The upper frame 9 and the lower frame 10 are made of resin. The upper frame 9 constitutes an upper part of the body frame 4, and the lower frame 10 constitutes a lower part of the body frame 4. The card movement path 3 is formed between the upper frame 9 and the lower frame 10. The upper frame 9 is formed with an opening in which a portion of the IC contact block 8 is disposed. This opening passes through the upper frame 9 in the up-down direction and leads to the card movement path 3. The bezel 6 is fixed to a front end of the body frame 4.

Figure 5A:
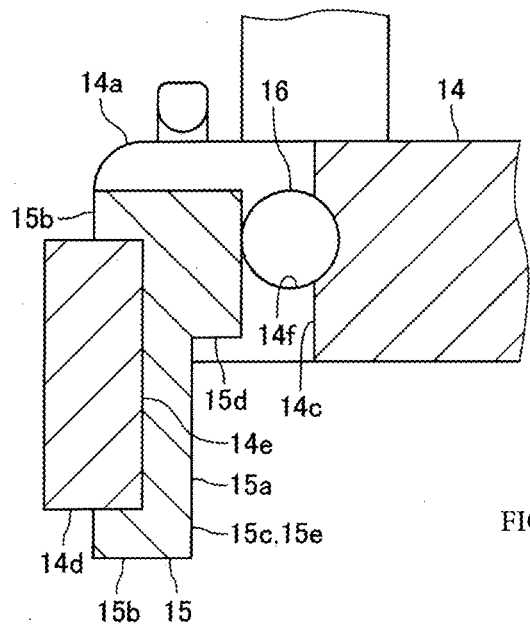
FIG. 5A is a sectional view of an E-E cross section of FIG. 3.
Figure 5B:
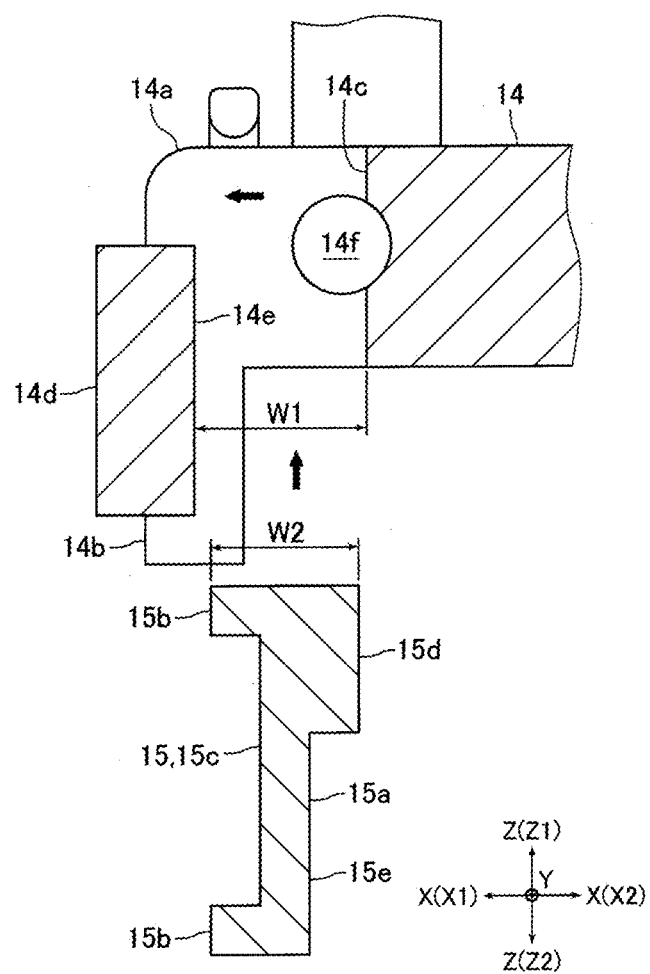
FIG. 5B is a sectional view for illustrating the installation procedure of a card abutting member illustrated in FIG. 5A.

IC contact block 8 is movable relative to the body frame 4 between a contact position 8A (see FIG. 4B) at which the IC contact springs 7 can come into contact with the contact external connection terminal 2a of the card 2, and a retreat position 8B (see FIG. 4A) at which the IC contact springs 7 retreat to such a position as not to come into contact with the external connection terminal 2a. A configuration of the IC contact block 8 and a surrounding area of the IC contact block 8 will be described below.
Configuration of IC Contact Block and Surrounding Area of IC Contact Block FIG. 5A is a sectional view of an E-E cross section of FIG. 3, and FIG. 5B is a sectional view for illustrating the installation procedure of the card abutting member 15 illustrated in FIG. 5A.

The IC contact block 8 includes a block body 14 that holds the plurality of IC contact springs 7, and a plurality of card abutting members 15 formed with card abutting surfaces 15a on which back side end surfaces (back end surfaces) of the card 2 inserted into the card reader 1 abut. The IC contact block 8 in this embodiment includes the two card abutting members 15. The card abutting members 15 are formed separately from the block body 14 and are mounted on the block body 14. The IC contact block 8 further includes a plurality of cam pins 16 and 17 to guide the IC contact block 8 between the contact position 8A and the retreat position 8B. The IC contact block 8 in this embodiment includes the two cam pins 16 and 17.

The cam pins 16 and 17 are formed separately from the block body 14. The cam pins 16 and 17 are formed into elongated cylinders. The cam pins 16 and 17 are disposed such that the axial direction of each of the cam pins 16 and 17 matches the left-right direction. In addition, the cam pin 16 and the cam pin 17 are disposed at an interval in the front-rear direction. In this embodiment, the cam pin 16 is disposed behind the cam pin 17.

The block body 14 is made of resin. In addition, the block body 14 is formed in the shape of a flat and substantially rectangular parallelepiped block. The block body 14 holds the plurality of IC contact springs 7 as described above. A flexible printed board (not illustrated) is connected to an upper end of each IC contact spring 7. The block body 14 is disposed such that the IC contact springs 7 face the card movement path 3 from above.

The block body 14 includes a holding part 14a that holds the card abutting members 15. The holding parts 14a constitute a rear end of the block body 14. The block body 14 of this embodiment includes the two holding parts 14a disposed at an interval in the left-right direction. The shape of each of the holding parts 14a when viewed from the left-right direction is L-shaped, and the rear end side of each holding part 14a is a projection part 14b that projects downward. The front surface of each projecting part 14b is a plane orthogonal to the front-rear direction. A lower surface of each projecting part 14b is a plane orthogonal to the up-down direction.

Each holding part 14a is formed with a placement hole 14c in which at least a portion of the card abutting member 15 is placed. In other words, the two placement holes 14c are formed in the block body 14. Side surfaces in the placement holes 14c are through holes that penetrate the holding parts 14a in the up-down direction. Side surfaces in the left-right direction side of each placement hole 14c is a plane orthogonal to the left-right direction. A front surface of each placement hole 14c is disposed in front of the front surface of the projection part 14b. The front surface of each placement hole 14c is a plane orthogonal to the front-rear direction. Rear surfaces of the placement holes 14c are disposed behind the front surfaces of the projection parts 14b.

Rear side parts (back side parts) of the placement holes 14c in the holding parts 14a are block body side regulating parts 14d to regulate the movement of the card abutting members 15 with respect to the block body 14 (FIG. 5B). In other words, the block body 14 includes the block body side regulating parts 14d (hereinafter referred to as "regulating parts 14d"). The cross-sectional shape of each regulating part 14d when viewed from the left-right direction is a rectangle with the long side in the up-down direction.

An upper surface and a lower surface of each regulating part 14d are planes orthogonal to the up-down direction. The upper surfaces of the regulating parts 14d are disposed below the upper surfaces of the holding parts 14a, and the lower surfaces of the regulating parts 14d are disposed above the lower surfaces of the holding parts 14a (specifically, the lower surfaces of the projecting parts 14b). A front surface 14e of each of the regulating parts 14d is a plane orthogonal to the front-rear direction. The front surfaces 14e of the regulating parts 14d are the rear surfaces of the placement holes 14c. In other words, the front surface 14e, which is one of the side surfaces of each regulating part 14d in the front-rear direction, is one of the side surfaces of the placement hole 14c in the front-rear direction. The front surfaces 14e of this embodiment are regulating part side surfaces.

The block body 14 is formed with an insertion hole 14f into which the cam pin 16 is inserted. The insertion hole 14f is a round hole that penetrates the block body 14 in the left-right direction. A front end of the insertion hole 14f is disposed in front of the front surface of the placement hole 14c, and a rear end of the insertion hole 14f is disposed behind the front surface of the placement hole 14c. In addition, an upper end of the insertion hole 14f is disposed above the upper surface of the regulating parts 14d, and the lower end of the insertion hole 14f is disposed below the upper surfaces of the regulating parts 14d. Both ends in the left-right direction of the cam pin 16 inserted into the insertion hole 14f are disposed outside the block body 14 in the left-right direction. The inner diameter of the insertion hole 14f is approximately equal to the outer diameter of the cam pin 16.

Similarly, the block body 14 is formed with an insertion hole into which the cam pin 17 is inserted. This insertion hole is a round hole that penetrates the block body 14 in the left-right direction. Both ends in the left-right direction of the cam pin 17 which is inserted into this insertion hole are disposed outside the block body 14 in the left-right direction. The inner diameter of this insertion hole is approximately equal to the outer diameter of the cam pin 17.

The card abutting members 15 are each formed into a block shape. In addition, the card abutting members 15 are made of a material harder than resin. Specifically, the card abutting members 15 are made of metal or ceramic. A side surface in the left-right direction of each card abutting member 15 is a plane orthogonal to the left-right direction. The upper surface and the lower surface of each card abutting member 15 are planes orthogonal to the up-down direction. Each card abutting member 15 includes two regulating protrusions 15b to regulate the movement of the card abutting member 15 relative to the block body 14 in the up-down direction, and a body part 15c to which base ends of the two regulating protrusions 15b are connected. Each card abutting member 15 in this embodiment is composed of the two regulating protrusions 15b and the one body part 15c.

A rear surface (back surface) of the body part 15c is a plane orthogonal to the front-rear direction. The body part 15c is composed of a body upper part 15d which constitutes an upper part of the body part 15c, and a body lower part 15e which constitutes a lower part of the body part 15c. The width in the front-rear direction of the body upper part 15d is wider than the width in the front-rear direction of the body lower part 15e. A front surface of the body upper part 15d and a front surface of the body lower part 15e are planes orthogonal to the front-rear direction. The front surface of the body upper part 15d is disposed in front of the front surface of the body lower part 15e. A front surface of the body lower part 15e is the card abutting surface 15a. A portion of the card abutting surface 15a is disposed within the card movement path 3.

The two regulating protrusions 15b project from the body part 15c towards the back side. In addition, the two regulating protrusions 15b are disposed at an interval in the up-down direction. One of the regulating protrusions 15b projects from an upper end of the body part 15c toward the back side, and the other regulating protrusion 15b projects from a lower end of the body part 15c toward the back side. The upper surface and the lower surface of each regulating protrusion 15b are planes orthogonal to the up-down direction. The rear surface of each regulating protrusion 15b is a plane orthogonal to the front-rear direction.

As described above, at least a portion of each card abutting member 15 is disposed in the placement hole 14c, and the two card abutting members 15 are mounted on the block body 14 at an interval in the left-right direction. In a state in which the card abutting members 15 are mounted on the block body 14, each regulating part 14d is disposed between the two regulating protrusions 15b in the up-down direction, and each regulating part 14d is in contact with the regulating protrusions 15b, as illustrated in FIG. 5A. Specifically, the lower surface of each regulating protrusion 15b which is disposed on the upper side is in contact with the front part of the upper surface of the regulating part 14d, and the upper surface of each regulating protrusion 15b which is disposed on the lower side is in contact with the front part of the lower surface of the regulating part 14d.

In addition, in a state in which the card abutting members 15 are mounted on the block body 14, the rear surfaces (back side surfaces) of the body parts 15c are in contact with the front surfaces 14e of the regulating parts 14d, and the front surfaces (near side surfaces) of the body parts 15c are in contact with the cam pin 16. Specifically, the front surfaces of the body upper parts 15d are in contact with the cam pin 16. The cam pin 16 in this embodiment is a regulation pin to regulate the movement of the card abutting members 15 in the front-rear direction with respect to the block body 14. In other words, in this embodiment, the cam pin 16 which is one of the two cam pins 16 and 17 is the regulation pin. The cam pin 16 functions to prevent the card abutting members 15 from coming off from the block body 14.

In a state in which the card abutting members 15 are mounted on the block body 14, the side surfaces in the left-right direction of the card abutting members 15 are in slight contact with the side surfaces in the left-right direction of the placement holes 14c, or face the side surfaces in the left-right direction of the placement holes 14c with slight gaps. In this state, the card abutting surfaces 15a are disposed slightly in front of the front surfaces of the projecting parts 14b. The upper surfaces of the card abutting members 15 are disposed below the upper surfaces of the holding parts 14a, and the lower surfaces of the card abutting members 15 are disposed at approximately the same position as the lower surfaces of the projecting parts 14b in the up-down direction.

The width W1 in the front-rear direction of each placement hole 14c (see FIG. 5B) is wider than the width W2 in the front-rear direction of each card abutting member 15 (see FIG. 5B). When the card abutting members 15 are mounted on the block body 14, the card abutting members 15 are inserted into the placement holes 14c from the lower side of the block body 14 not mounted with the cam pin 16, and then move the card abutting members 15 to the rear side (see arrows in FIG. 5B). Thereafter, the cam pin 16 is inserted into the insertion holes 14f and fix the card abutting members 15. When the card abutting members 15 are removed from the block body 14, the cam pin 16 is removed and the card abutting members 15 are moved to the front side and then moved to the lower side.

The upper frame 9 is formed with cam grooves 9a and 9b to guide the IC contact block 8 between the contact position 8A and the retreat position 8B (see FIGS. 4A and 4B). The cam grooves 9a and 9b are disposed outside the block body 14 in the left-right direction. An end of the cam pin 16 which projects outside the block body 14 in the left-right direction is engaged with the cam grooves 9a. An end of cam pin 17 which projects outside the block body 14 in the left-right direction is engaged with the cam grooves 9b.

The IC contact block 8 is urged toward the retreat position 8B by a spring member such as a tension coil spring (not illustrated). The IC contact block 8 which is disposed at the retreat position 8B is disposed on the near and upper side with respect to the IC contact block 8 which is disposed at the contact position 8A. When the card 2 is not inserted into the card reader 1, the IC contact block 8 is disposed at the retreat position 8B by urging force of the spring member. When the card 2 is inserted into the card reader 1, the back end surface of the card 2 which moves on the card movement path 3 toward the back side abuts on the card abutting surfaces 15a.

When the card abutting members 15 are pushed toward the back side by the card 2 that abuts on the card abutting surfaces 15a, the IC contact block 8 moves from the retreat position 8B to the contact position 8A. The IC contact block 8 that moves from the retreat position 8B to the contact position 8A moves downward as the IC contact block 8 moves toward the back side. Therefore, when the IC contact block 8 moves from the retreat position 8B to the contact position 8A, the card 2 moves relatively in the up-down direction with respect to the card abutting surfaces 15a in a state in which the back end surface of the card 2 is in contact with the card abutting surfaces 15a at predetermined contact pressure.

When the IC contact block 8 reaches the contact position 8A, the IC contact springs 7 are in contact with the external connection terminal 2a of the card 2 at the predetermined contact pressure, and reading of data recorded on the card 2 and recording of data on the card 2 are performed. When the card 2 inserted into the card reader 1 is pulled out, the IC contact block 8 located at the contact position 8A moves to the retreat position 8B by the urging force of the spring member.

Main Effects of This Embodiment

As described above, in this embodiment, the card abutting members 15 are made of metal or ceramic that is harder than resin. Therefore, in this embodiment, when the IC contact block 8 moves from the retreat position 8B toward the contact position 8A, even if the card 2 moves relatively in the up-down direction with respect to the card abutting surfaces 15a in the state in which the back end surface of the metal card 2 is in contact with the card abutting surfaces 15a at the predetermined contact pressure, it is possible to suppress the occurrence of scratches and abrasion on the card abutting surfaces 15a. Therefore, in the card reader 1 of this embodiment, even when the metal card 2 is processed, it is possible to suppress the occurrence of scratches and abrasion on the card abutting surfaces 15a.

In this embodiment, each regulating part 14d of the block body 14 is disposed between the two regulating protrusions 15b of each card abutting member 15 in the up-down direction, and the lower surfaces of the regulating protrusions 15b disposed on the upper side are in contact with the upper surfaces of the regulating parts 14d, and the upper surfaces of the regulating protrusions 15b disposed on the lower side are in contact with the lower surfaces of the regulating parts 14d. In addition, in this embodiment, the rear surfaces of the body parts 15c of the card abutting members 15 are in contact with the front surfaces 14e of the regulating parts 14d, and the front surfaces of the body parts 15c are in contact with the cam pin 16. Therefore, in this embodiment, the card abutting members 15 can be more securely mounted on the block body 14 compared to a case where the card abutting members 15 are mounted on the block body 14 by adhesive or press-fitting. Therefore, in this embodiment, even when the back end surface of the card 2 repeatedly abuts on the card abutting surfaces 15a, or even when the card 2 repeatedly moves in the up-down direction relative to the card abutting surfaces 15a, the card abutting members 15 become difficult to come off from the block body 14.

In this embodiment, the width W1 in the front-rear direction of each placement hole 14c of the block body 14 is wider than the width W2 in the front-rear direction of each card abutting member 15, and when the cam pin 16 is removed from the insertion hole 14f of the block body 14, the card abutting members 15 can be removed from the block body 14 by using the placement holes 14c. Therefore, in this embodiment, it becomes possible to easily mount and replace the card abutting members 15.

In this embodiment, the movement of the card abutting members 15 in the front-rear direction with respect to the block body 14 is regulated by the cam pin 16 to engage with the cam grooves 9a and guide the IC contact block 8 between the contact position 8A and the retreat position 8B. Therefore, in this embodiment, the configuration of the card reader 1 can be simplified compared to a case where a pin is separately provided to regulate the movement of the card abutting members 15 in the front-rear direction with respect to the block body 14. In addition, in this embodiment, the two card abutting members 15 are mounted on the block body 14 at an interval in the left-right direction, and therefore it is possible to stabilize the state of the card 2 that abuts on the card abutting surfaces 15a.

Figure 6A:
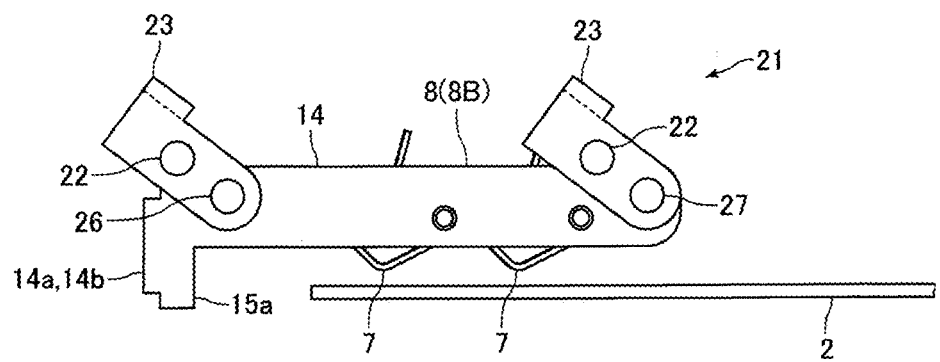
FIGS. 6A and 6B are each a side view for illustrating a configuration of an IC contact block according to another embodiment of at least an embodiment of the present invention.
Figure 6B:
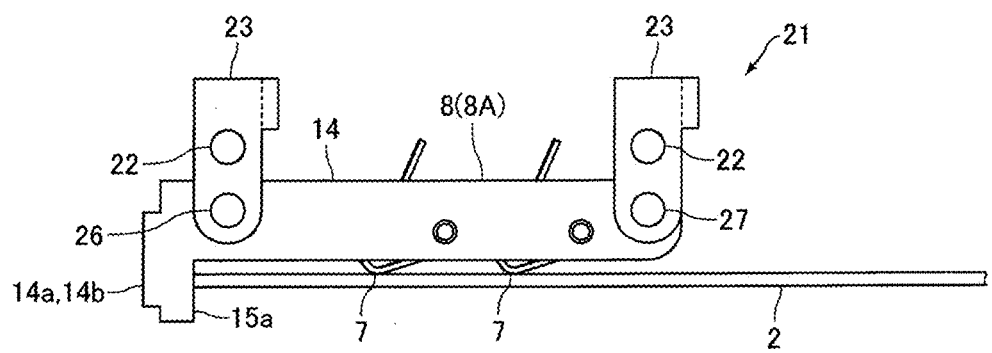
Figure 6B:
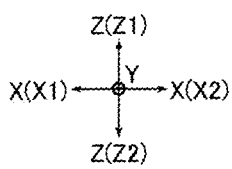
Figure 7:
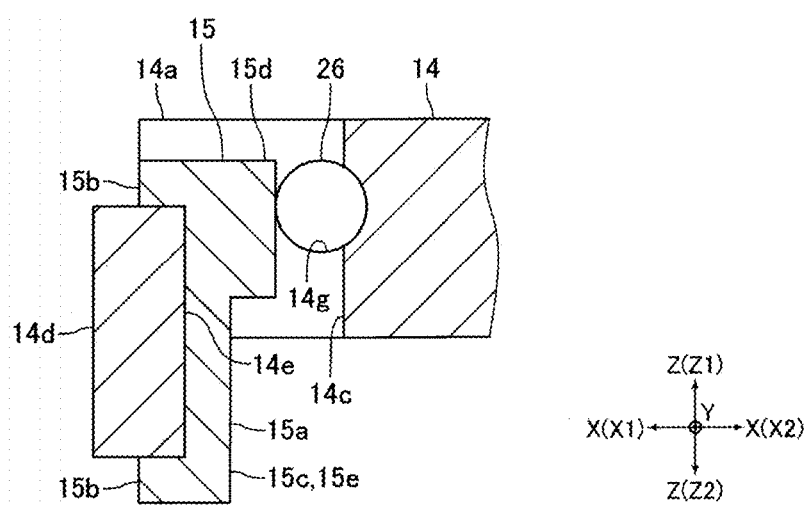
FIG. 7 is a sectional view for illustrating the configuration of the IC contact block illustrated in FIGS. 6A and 6B.

Modification of IC Contact Block and Surrounding Area of IC Contact Block FIGS. 6A and 6B are each a side view for illustrating a configuration of an IC contact block 8 according to another embodiment of at least an embodiment of the present invention. FIG. 7 is a sectional view for illustrating the configuration of the IC contact block 8 illustrated in FIGS. 6A and 6B. In addition, in FIGS. 6A and 6B and FIG. 7, the same reference numerals are given to the same configurations as those described above.

In the above configuration, the IC contact block 8 is guided between the contact position 8A and the retreat position 8B by the cam grooves 9a and 9b and the cam pins 16 and 17, but as illustrated in FIGS. 6A and 6B, the IC contact block 8 may be guided between the contact position 8A and the retreat position 8B by a parallel link mechanism 21. In this modification, a card reader 1 includes two fixed side pins 22 mounted on an upper frame 9, and two link members 23 that are rotatable with the left-right direction as the axis of rotation and with the fixed side pins 22 as the rotation centers.

The two fixed side pins 22 are disposed at an interval in the front-rear direction, and the two link members 23 are disposed at an interval in the front-rear direction. The fixed side pins 22, for example, are rotatably held by the upper frame 9. For example, the link members 23 are rotatably held by the fixed side pins 22. The IC contact block 8 includes two link pins 26 and 27 that are rotatably held by the link members 23. The link pin 26 is disposed behind the link pin 27. The parallel link mechanism 21 is composed of the two fixed side pins 22, the two link members 23, and the two link pins 26 and 27.

A block body 14 is formed with an insertion hole 14g into which the link pin 26 is inserted. Both ends in the left-right direction of the link pin 26 inserted into the insertion hole 14g are disposed outside the block body 14 in the left-right direction, and the ends of the link pin 26 that project outside the block body 14 in the left-right direction are rotatably held by the link members 23. For example, the link pin 26 is rotatable relative to the block body 14.

Similarly, the block body 14 is formed with an insertion hole into which the link pin 27 is inserted. Both ends in the left-right direction of the link pin 27 inserted into this insertion hole are disposed outside the block body 14 in the left-right direction, and the ends of the link pin 27 that project outside the block body 14 in the left-right direction are rotatably held by the link members 23. For example, the link pin 27 can be rotated relative to the block body 14.

As illustrated in FIG. 7, in a state in which card abutting members 15 are mounted on block body 14, a front surface of a body part 15c (specifically, a front surface of a body upper part 15d) is in contact with the link pin 26. In this modification, the link pin 26 is a regulation pin to regulate the movement of the card abutting members 15 in the front-rear direction with respect to the block body 14. In other words, in this modification, the link pin 26 which is one of the two link pins 26 and 27 is a regulation pin.

In this modification, the link pin 26 that constitutes the parallel link mechanism 21 regulates the movement of the card abutting members 15 in the front-rear direction with respect to the block body 14, and therefore the configuration of the card reader 1 can be simplified compared to a case where a pin to regulate the movement of the card abutting members 15 in the front-rear direction with respect to the block body 14 is provided separately. In addition, in this modified example, the same effect as the above-described embodiment can be obtained.

Another Embodiments

Although the above-described embodiment is an example of a preferred embodiment of at least an embodiment of the present invention, it is not limited thereto, and various modifications may be made without changing the gist of at least an embodiment of the present invention.

In the embodiment described above, the two regulating protrusions 15b may project toward the near side from the body part 15c. In this case, parts on the near side of the placement holes 14c of the holding parts 14a are block body side regulating parts to regulate the movement of the card abutting members 15 with respect to the block body 14, and surfaces on the near side of the body parts 15c are in contact with the back side surfaces of the block body side regulating parts which are regulating part side surfaces. In addition, in this case, the cam pin 16 is disposed behind the card abutting members 15, and the back side surfaces of the body parts 15c are in contact with the cam pin 16.

In the above embodiment, the IC contact block 8 may include a regulation pin to regulate the movement of the card abutting members 15 in the front-rear direction with respect to the block body 14, in addition to the cam pin 16. In this case, the surfaces on the near side of the body parts 15c are not in contact with the cam pin 16, but in contact with the regulation pin. In addition, in this case, the cam pin 16 may be formed integrally with the block body 14.

In the modification illustrated in FIGS. 6A and 6B and FIG. 7, the IC contact block 8 may include a regulation pin to regulate the movement of the card abutting members 15 in the front-rear direction with respect to the block body 14, in addition to the link pin 26. In this case, the surfaces on the near side of the body parts 15c are not in contact with the link pin 26, but in contact with the regulation pin. In addition, in this case, the link pin 26 may be formed integrally with the block body 14.

In the above embodiment, the number of the card abutting members 15 included in the IC contact block 8 may be three or more, or may be one. In addition, in the above embodiment, the IC contact block 8 may include three or more cam pins. Further, in the above embodiment, the cam pins 16 and 17 may be fixed to the block body 14. In addition, in the modification illustrated in FIGS. 6A and 6B and FIG. 7, the link pins 26 and 27 may be fixed to the block body 14. Furthermore, the link pins 26 and 27 may be fixed to the link members 23.

In the above embodiment, the card abutting members 15 may be mounted on the block body 14 by adhesive or press-fitting. The card abutting members 15 may also be mounted on the block body 14 with screws. In this case, there is no need for any regulation pin to regulate the movement of the card abutting members 15 in the front-rear direction with respect to the block body 14. In this case, the block body 14 may not be formed with the placement holes 14c or the regulating parts 14d, and the card abutting members 15 may not be formed with the regulating protrusions 15b.

In the above embodiment, the card reader 1 is a manual card reader, but the card reader 1 may also be a card transport type card reader that has a card transport mechanism that automatically transports the card 2. In this case, a card transport path corresponding to the card movement path 3 is formed inside the card reader 1. A polyethylene terephthalate (PET) card with a thickness of approximately 0.18 to 0.36 mm, a paper card with a predetermined thickness, or the like may be processed by the card reader 1.

Configuration of This Technology

This technology can have the following configuration.

(1) A card reader including:
a plurality of IC contact springs to come into contact with an external connection terminal of an IC chip formed in a card; an IC contact block to hold a plurality of the IC contact springs; and a body frame formed with a card movement path to allow the card to move, wherein
when one side in a movement direction of the card that linearly moves on the card movement path is defined as a back side, a side opposite to the back side is defined as a near side, and one side in a thickness direction of the card that linearly moves on the card movement path is defined as a first direction side,
the IC contact block includes: a resin block body to hold a plurality of the IC contact springs; and a card abutting member formed with a card abutting surface on which an end surface on the back side of the card abuts, formed separately from the block body, and mounted on the block body, and the IC contact block is movable with respect to the body frame between a contact position at which the IC contact springs are capable of coming into contact with the external connection terminal and a retreat position at which the IC contact springs retreat to such a position as not to come into contact with the external connection terminal,
when the card abutting member is pushed toward the back side by the card which abuts on the card abutting surface, the IC contact block moves from the retreat position toward the contact position,
the IC contact block that moves from the retreat position toward the contact position moves toward the first direction side as the IC contact block moves toward the back side, and
the card abutting member is made of a material harder than resin.

(2) The card reader described in (1), wherein the card abutting member is made of metal or ceramic.

(3) The card reader described in (1) or claim (2), wherein the card abutting member includes: two regulating protrusions to regulate movement of the card abutting member in the thickness direction of the card with respect to the block body; and a body part to which base ends of the two regulating protrusions are connected,
the two regulating protrusions project from the body part toward the back side or the near side and are disposed at an interval in the thickness direction of the card, the block body includes a block body side regulating part disposed in contact with the regulating protrusions between the two regulating protrusions in the thickness direction of the card, the IC contact block includes a regulation pin to regulate movement of the card abutting member in the movement direction of the card with respect to the block body,
the block body is formed with a placement hole to allow at least a portion of the card abutting member to be disposed, and an insertion hole into which the regulation pin is inserted,
a regulating part side surface which is a side surface of the block body side regulating part in the movement direction of the card is one of side surfaces of the placement hole in the movement direction of the card,
a width of the placement hole in the movement direction of the card is wider than a width of the card abutting member in the movement direction of the card,
in a case where the regulating protrusions project toward the back side, a surface on the back side of the body part is in contact with the regulating part side surface, and a surface on the near side of the body part is in contact with the regulation pin,
in a case where the regulating protrusions project toward the near side, the surface on the near side of the body part is in contact with the regulating part side surface, and the surface on the back side of the body part is in contact with the regulation pin.

(4) The card reader described in (3), wherein the body frame is formed with cam grooves to guide the IC contact block between the contact position and the retreat position,
the IC contact block includes a plurality of cam pins to engage with the cam grooves and guide the IC contact block between the contact position and the retreat position, and
one of a plurality of the cam pins is the regulation pin.

(5) The card reader described in (3), including:
two fixed side pins mounted on the body frame; and two link members rotatable with a width direction of the card as an axis of rotation and with the fixed side pins as rotation centers,
when a direction orthogonal to the movement direction of the card and the thickness direction of the card is defined as the width direction of the card, wherein
the two fixed side pins are disposed at an interval in a transport direction of the card,
the two link members are disposed at an interval in the transport direction of the card,
the IC contact block includes two link pins rotatably held or fixed by the link members,
a parallel link mechanism to guide the IC contact block between the contact position and the retreat position is composed of the two fixed side pins, the two link members, and the two link pins, and
one of the two link pins is the regulation pin.

(6) The card reader described in any of (1) to (5), wherein when a direction orthogonal to the movement direction of the card and the thickness direction of the card is defined as a width direction of the card,
a plurality of the card abutting members are mounted on the block body at an interval in the width direction of the card.

What is claimed is:
1. A card reader comprising:
a plurality of IC contact springs to come into contact with an external connection terminal of an IC chip formed in a card; an IC contact block to hold a plurality of the IC contact springs; and a body frame formed with a card movement path to allow the card to move, wherein when one side in a movement direction of the card that linearly moves on the card movement path is defined as a back side, a side opposite to the back side is defined as a near side, and one side in a thickness direction of the card that linearly moves on the card movement path is defined as a first direction side, the IC contact block comprises: a resin block body to hold a plurality of the IC contact springs; and a card abutting member formed with a card abutting surface on which an end surface on the back side of the card abuts, formed separately from the block body, and mounted on the block body, and the IC contact block is movable with respect to the body frame between a contact position at which the IC contact springs are capable of coming into contact with the external connection terminal and a retreat position at which the IC contact springs retreat to such a position as not to come into contact with the external connection terminal, when the card abutting member is pushed toward the back side by the card which abuts on the card abutting surface, the IC contact block moves from the retreat position toward the contact position, the IC contact block that moves from the retreat position toward the contact position moves toward the first direction side as the IC contact block moves toward the back side, and the card abutting member is made of a material harder than resin, wherein the card abutting member comprises: two regulating protrusions to regulate movement of the card abutting member in the thickness direction of the card with respect to the block body; and a body part to which base ends of the two regulating protrusions are connected, the two regulating protrusions project from the body part toward the back side or the near side and are disposed at an interval in the thickness direction of the card, the block body comprises a block body side regulating part disposed in contact with the regulating protrusions between the two regulating protrusions in the thickness direction of the card, the IC contact block comprises a regulation pin to regulate movement of the card abutting member in the movement direction of the card with respect to the block body, the block body is formed with a placement hole to allow at least a portion of the card abutting member to be disposed, and an insertion hole into which the regulation pin is inserted, a regulating part side surface which is a side surface of the block body side regulating part in the movement direction of the card is one of side surfaces of the placement hole in the movement direction of the card, a width of the placement hole in the movement direction of the card is wider than a width of the card abutting member in the movement direction of the card, in a case where the regulating protrusions project toward the back side, a surface on the back side of the body part is in contact with the regulating part side surface, and a surface on the near side of the body part is in contact with the regulation pin, in a case where the regulating protrusions project toward the near side, the surface on the near side of the body part is in contact with the regulating part side surface, and the surface on the back side of the body part is in contact with the regulation pin.

2. The card reader according to claim 1, wherein the card abutting member is made of metal or ceramic.

3. The card reader according to claim 2, wherein the body frame is formed with cam grooves to guide the IC contact block between the contact position and the retreat position, the IC contact block comprises a plurality of cam pins to engage with the cam grooves and guide the IC contact block between the contact position and the retreat position, and one of a plurality of the cam pins is the regulation pin.

4. The card reader according to claim 2, comprising:
two fixed side pins mounted on the body frame; and two link members rotatable with a width direction of the card as an axis of rotation and with the fixed side pins as rotation centers, when a direction orthogonal to the movement direction of the card and the thickness direction of the card is defined as the width direction of the card, wherein the two fixed side pins are disposed at an interval in a transport direction of the card, the two link members are disposed at an interval in the transport direction of the card, the IC contact block comprises two link pins rotatably held or fixed by the link members, a parallel link mechanism to guide the IC contact block between the contact position and the retreat position is composed of the two fixed side pins, the two link members, and the two link pins, and one of the two link pins is the regulation pin.

5. The card reader according to claim 2, wherein when a direction orthogonal to the movement direction of the card and the thickness direction of the card is defined as a width direction of the card, a plurality of the card abutting members are mounted on the block body at an interval in the width direction of the card.

6. The card reader according to claim 1, wherein when a direction orthogonal to the movement direction of the card and the thickness direction of the card is defined as a width direction of the card, a plurality of the card abutting members are mounted on the block body at an interval in the width direction of the card.

7. The card reader according to claim 1, wherein the body frame is formed with cam grooves to guide the IC contact block between the contact position and the retreat position, the IC contact block comprises a plurality of cam pins to engage with the cam grooves and guide the IC contact block between the contact position and the retreat position, and one of a plurality of the cam pins is the regulation pin.

8. The card reader according to claim 1, comprising:
two fixed side pins mounted on the body frame; and two link members rotatable with a width direction of the card as an axis of rotation and with the fixed side pins as rotation centers, when a direction orthogonal to the movement direction of the card and the thickness direction of the card is defined as the width direction of the card, wherein the two fixed side pins are disposed at an interval in a transport direction of the card, the two link members are disposed at an interval in the transport direction of the card, the IC contact block comprises two link pins rotatably held or fixed by the link members, a parallel link mechanism to guide the IC contact block between the contact position and the retreat position is composed of the two fixed side pins, the two link members, and the two link pins, and
one of the two link pins is the regulation pin.

\* \* \* \* \*